United States Patent [19]
Morinaga et al.

[11] Patent Number: 5,504,912
[45] Date of Patent: Apr. 2, 1996

[54] COPROCESSOR EXECUTING PIPELINE CONTROL FOR EXECUTING PROTOCOLS AND INSTRUCTIONS

[75] Inventors: Shigeki Morinaga, Hitachi; Norio Nakagawa, Kodaira; Mitsuru Watabe, Katsuta; Mamoru Ohba, Hitachi; Hiroyuki Kida, Hitachi; Hisashi Kaziwara, Hitachi; Takeshi Asai, Hitachi; Junichi Tatezaki, Kodaira, all of Japan

[73] Assignees: Hitachi, Ltd., Tokyo; Hitachi Engineering Co., Ltd., Hitachi, both of Japan

[21] Appl. No.: 830,460

[22] Filed: Feb. 5, 1992

Related U.S. Application Data

[63] Continuation of Ser. No. 652,395, Feb. 7, 1991, abandoned, which is a continuation of Ser. No. 182,146, Apr. 15, 1988, abandoned.

[30] Foreign Application Priority Data

Apr. 17, 1987 [JP] Japan .................................. 62-930987

[51] Int. Cl.$^6$ .................................................. G06F 15/16
[52] U.S. Cl. ...................... 395/800; 395/375; 364/242.6; 364/240.8; 364/231.8
[58] Field of Search .................... 395/375, 800; 364/DIG. 1

[56] References Cited

U.S. PATENT DOCUMENTS

| | | | |
|---|---|---|---|
| 4,270,167 | 5/1981 | Koehler et al. | 364/200 |
| 4,298,936 | 11/1981 | Shapiro | 364/200 |
| 4,509,116 | 4/1985 | Lackey et al. | 364/200 |
| 4,547,849 | 10/1985 | Louie et al. | 364/200 |
| 4,589,067 | 5/1986 | Porter et al. | 364/200 |
| 4,745,544 | 5/1988 | Renner et al. | 364/200 |
| 4,760,525 | 7/1988 | Webb | 364/200 |
| 4,766,536 | 8/1988 | Wilson, Jr. et al. | 364/200 |
| 4,774,659 | 9/1988 | Smith et al. | 364/200 |
| 4,777,613 | 10/1988 | Shahan et al. | 364/200 |
| 4,811,208 | 3/1989 | Myers et al. | 364/200 |
| 4,814,970 | 3/1989 | Barbagelata et al. | 364/200 |
| 4,821,231 | 4/1989 | Cruess et al. | 364/200 |
| 4,879,676 | 11/1989 | Hansen | 364/748 |
| 4,884,197 | 11/1989 | Sach et al. | 364/200 |
| 5,041,969 | 8/1991 | Kawasaki et al. | 364/200 |

FOREIGN PATENT DOCUMENTS

| | | |
|---|---|---|
| 2291545 | 6/1976 | France . |
| 1490612 | 11/1977 | United Kingdom . |

OTHER PUBLICATIONS

Ching–Ming Lai, "Reducing AP Overhead Optimizes Performance for Signal Processor", *Computer Technology Review*, vol. VI, No. 2, pp. 37–41 (1986).

R. E. Higginbotham et al., "Real–Time Signal Processing with FPS Array Processor", *Electro/80 Conference Record*, pp. 1–11 (May 13–15, 1980).

J. M. Grosch et al., "Parallel Arithmetic Computation Using a Dedicated Arithmetic Processor", *Proceedings of the National Electronics Conference*, vol. 36, pp. 209–212 (1982).

"Pipelining in Floating Point Processors", *IBM Technical Disclosure Bulletin*, vol. 29, No. 7, pp. 2903–2906 (Dec. 1986).

*Primary Examiner*—Christopher B. Shin
*Attorney, Agent, or Firm*—Kenyon & Kenyon

[57] ABSTRACT

The interface portion of a coprocessor is provided with a FIFO (First-In First-Out) buffer and means for accepting instructions in succession. Pipeline control of the instructions becomes possible in this way, and protocol means associated with a microprocessor is also provided.

3 Claims, 8 Drawing Sheets

COMMAND TRANSFER PROTOCOL

COMMAND TRANSFER PROTOCOL

COPROCESSOR EXECUTING PIPELINE CONTROL FOR EXECUTING PROTOCOLS AND INSTRUCTIONS

This application is a continuation of application Ser. No. 07/652,395, filed on Feb. 7, 1991, abandoned, which is a continuation of application Ser. No. 07/182,146, filed on Apr. 15, 1988, abandoned.

BACKGROUND OF THE INVENTION:

The present invention relates to a pipeline system, and more particularly to the interface system of a coprocessor which is well suited to high-speed processing of a floating-point processor that is the coprocessor of a processor.

As stated in "IEEE MICRO," pp. 44–54, 1983. 12 by way of example, in a coprocessor interface of the prior art there is a system wherein, when one instruction has ended and the next instruction has been sent, a status in the execution of the operation of the preceding instruction is brought back. Therefore, the instructions are intermittently sent to a coprocessor one by one, and the overhead of the interface is heavy.

The prior-art technique does not take into consideration the enhancement of the throughput of operations, and has the problem of a long operating time.

SUMMARY OF THE INVENTION

An object of the present invention is to raise the operating speed of a coprocessor in such a way that the acceptance of instructions in the coprocessor is pipelined.

This and other objects are accomplished by dividing the function of the coprocessor, especially a floating-point processor.

More specifically, the interface portion of the coprocessor is provided with a FIFO (First-In First-Out) buffer and means for accepting instructions in succession. The pipeline control of the instructions becomes possible in this way, and protocol means associated with a microprocessor is also provided.

By disposing the FIFO in the interface portion of the coprocessor, the microprocessor can send data items until the FIFO is filled up, and further, the coprocessor has its functions divided so as to be capable of the pipeline control, so that data items are successively processed at high speed.

Therefore, the present invention can execute an operation at high speed.

DETAILED DESCRIPTION OF THE PRESENT INVENTION

Figure 1:
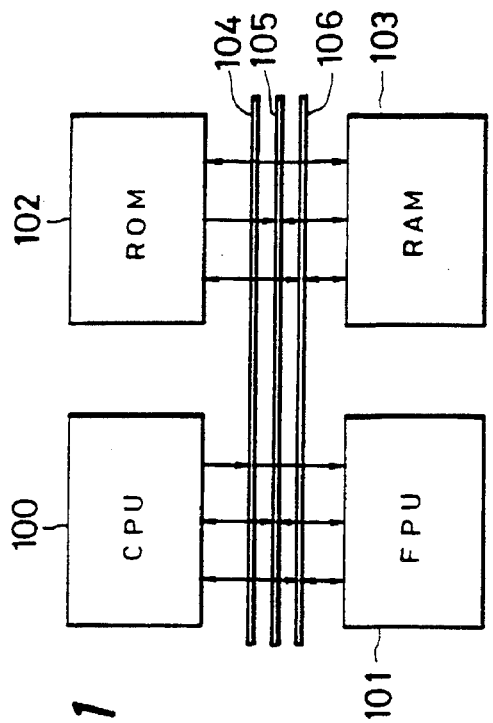
FIG. 1 is a diagram of a microcomputer system which includes a coprocessor in an embodiment of the present invention.

An embodiment of the present invention will be described with reference to FIG. 1. Shown in FIG. 1 is a microcomputer system which realizes floating-point arithmetic. In order to perform the floating-point arithmetic, this system has two arithmetic circuits; a CPU (Central Processing Unit) 100 and a FPU (Floating-point Processing Unit) 101, which are preferably integrated on semiconductor substrates separate from each other but which may well be integrated on a single semiconductor substrate. Essentially, the CPU 100 processes only data of the integer type and cannot process data of the floating-point type. On the other hand, the FPU 101 can process data of the floating-point type. A ROM (Read Only Memory) 102 stores a program in which instructions for the two arithmetic circuits of the CPU 100 and the FPU 101 coexist. However, it is the CPU 100 that can decode the instructions. Therefore, the FPU 101 is interfaced at high speed by protocols with the CPU 100. Here, the FPU 101 having such properties shall be called the "coprocessor."

A RAM (Random Access Memory) 103 holds data of the integer type and the floating-point type. Numeral 104 indicates an address bus for addresses delivered from the CPU 100. Numeral 105 indicates a data bus, and numeral 106 a control bus for controls concerning interfaces.

Next, the details of a coprocessor interface will be described by referring to the floating-point coprocessor (FPU) 101 as an example.

Figure 2:
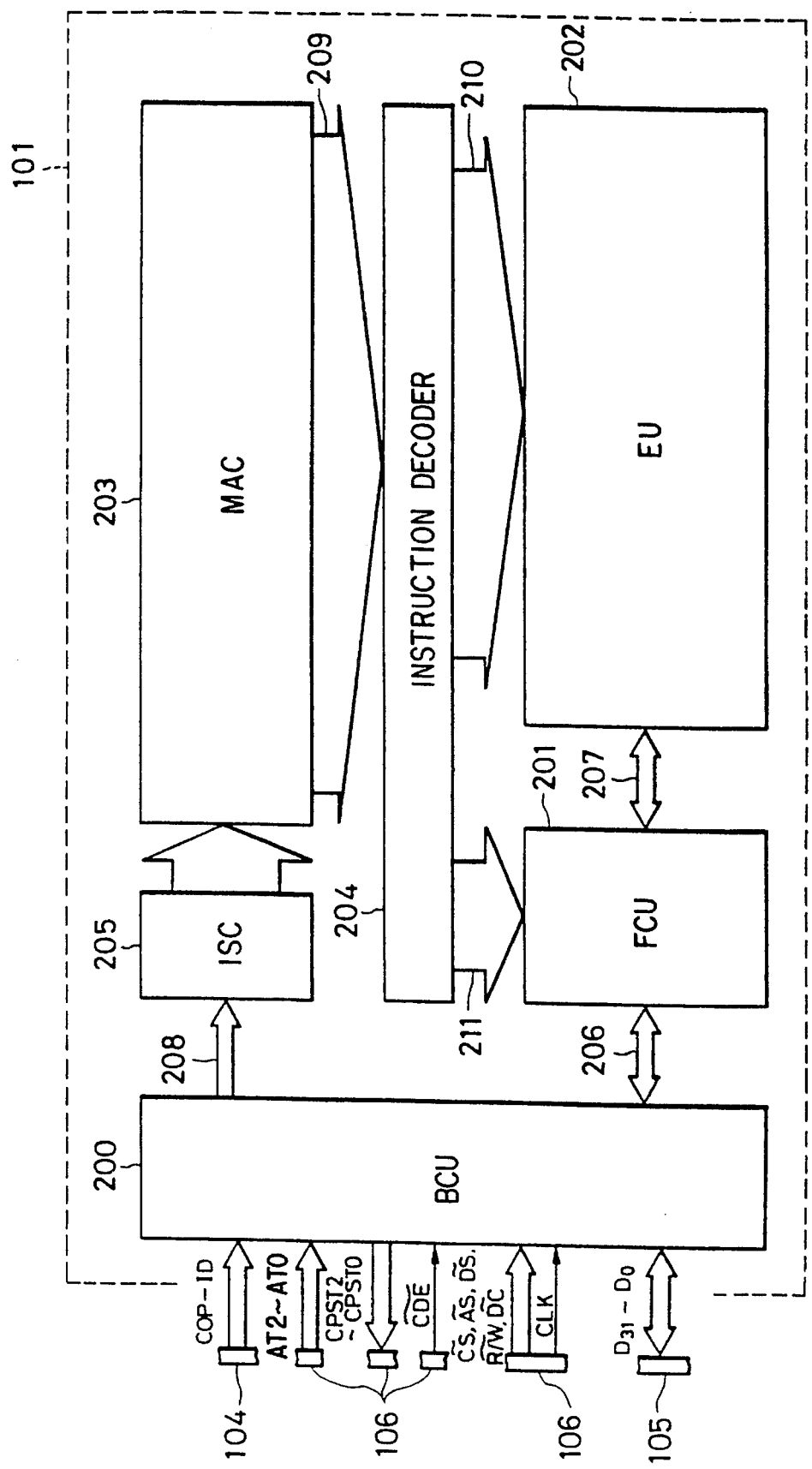
FIG. 2 is a diagram of an embodiment of the blocks of a floating-point processor according to the present invention.

FIG. 2 shows a block diagram of the floating-point coprocessor 101.

Numeral 200 indicates a bus control unit (BCU) which executes the coprocessor interface of high speed. Input/output signals connected to the BCU 200 are signals CLK, D31–D0, $\overline{CS}$, $\overline{AS}$, $\overline{DS}$, R/$\overline{W}$, $\overline{DC}$, $\overline{CDE}$, CPST2–CPST0, AT3–AT0, and A2–A0. The signal CLK is a clock signal which is externally supplied, and which serves as the reference of the internal operations of the floating-point coprocessor. The signals D31–D0 are data signals. In the figure, the signal $\overline{CS}$ is a chip select signal for selecting the FPU 101. The signal $\overline{AS}$ is an address strobe input signal which indicates that an address signal exists on the address bus 104. The signal $\overline{DS}$ is a data strobe input signal which indicates that a data signal exists on the data bus 105. The signal R/$\overline{W}$ is an input signal indicating the direction of data transfer, and it becomes "1" when the CPU 100 reads data from an external memory, while it becomes "0" when the CPU writes data thereinto. The signal $\overline{DC}$ indicates that data transfer on the data bus 105 has ended. In a case where data is transferred between the CPU 100 and the FPU 101, the signal $\overline{DC}$ is output from the FPU 101 to the CPU 100. Besides, in a case where data is transferred between the FPU 101 and the external memory, the signal DC is input from the external memory to the FPU 101. The signal $\overline{CDE}$ is a coprocessor data enable signal. Upon lapse of one clock cycle after this signal has been asserted, the FPU 101 outputs a destination operand onto the data bus 105. This signal is applied from the CPU 100 as an output timing recognition signal. The signals CPST2–CPST0 are signals which indicate the internal operation status of the FPU 101. In addition, the signals AT2–AT0 are signals which are output from the CPU 100 and which indicate the sort of an access. The FPU 101 operates in such a way that the type of control information to be transferred from the CPU 100 is recognized on the basis of these signals. That is, the FPU 101 operates upon receiving the signals AT2–AT0 from the CPU 100 and returns the signals CPST2–CPST0 indicative of its operating status to the CPU 100, thereby executing the coprocessor protocol.

Table 1 and Table 2 are the decode tables of the signals CPST2–CPST0 and AT2–AT0, respectively.

The signals AT2–AT0 are address data signals which are output from the CPU 100.

By decoding a command as described above, the protocol between the CPU 100 and the FPU 101 is controlled and managed.

TABLE 1

Decode Table of Signals CPST2–CPST0.

| CPST 2 1 0 | Name | Description |
|---|---|---|
| 1 1 1 | Coprocessor non-connection exception (NOCN) | An FPU not connected has been designated. |
| 1 1 0 | Coprocessor operation exception (EXCP) | An exception has arisen as the result of the execution of a command. |
| 1 0 1 | Command error (CERR) | A fetched command is not defined. |
| 1 0 0 | — | — |
| 0 1 1 | Data transfer ready/ Condition not held (DTR) | An operand which is transferred to a memory has output, or a condition is false as the result of the execution of a conditional branch command. |
| 0 1 0 | Command accepted/ Condition held (ACC) | A normal command has been input, or a condition is true as the result of the execution of a conditional branch command. |
| 0 0 1 | Busy (BUSY) | Status in which operand transfer is not ready, or a command is not acceptable. |
| 0 0 0 | — | — |

TABLE 2

Decode Table of Signals AT2–AT0

| AT 2 1 0 | Name | Description |
|---|---|---|
| 1 1 1 | CPU-FPU data transfer | Data transfer between the CPU and the register of the FPU. |
| 1 1 0 | Command | A command is transferred from the CPU to the FPU. |
| 1 0 1 | Instruction address transfer | The address of an FPU instruction is transferred from the CPU. |
| 1 0 0 | Memory-FPU data transfer | Data transfer between a memory and the register of the FPU. |
| Other codes | Meaningless | No operations. |

Numeral 201 indicates a format conversion unit (FCU) by which single-precision data, double-precision data and double-extended-precision data represented in an external format are converted into data in an internal format (double-extended-precision format).

Figure 3:
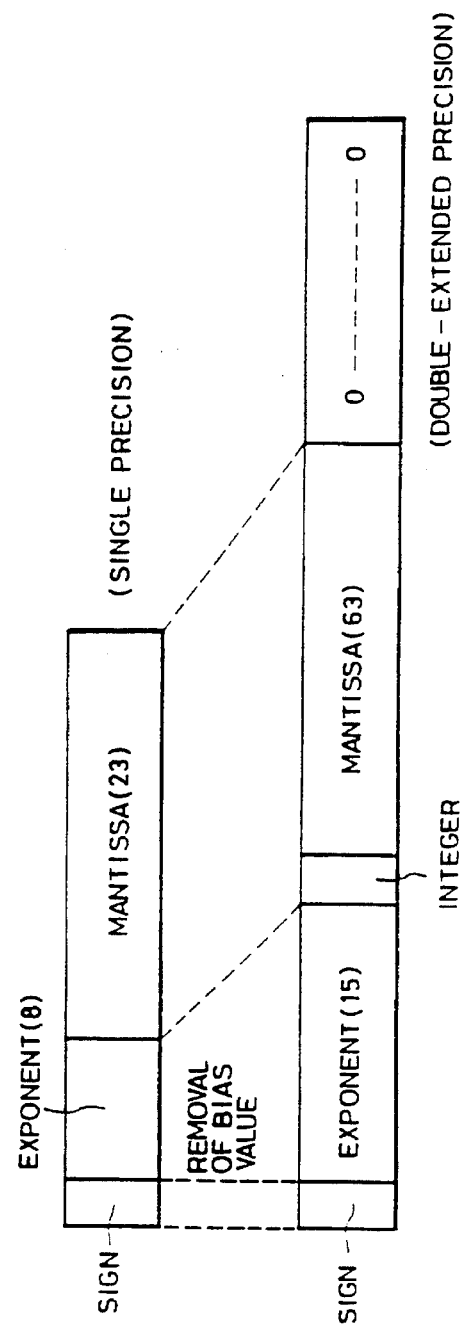
FIG. 3 is a diagram for explaining a format conversion function.

Input/output data to or from the FCU 201 is transferred through the BCU 200 as well as a conversion data bus 206. An example of the operation is shown in FIG. 3. By way of example, in a case where external data stored in the BCU 200 is single-precision data (having a sign of 1 bit, an exponent of 8 bits, and a mantissa of 23 bits), it is input to the FCU 201 through the conversion data bus 206. As shown in FIG. 3, the exponent part of the single-precision data having been input to the FCU 201 has its bias value removed into an exponent of 15 bits in conformity with the specification of IEEE. In addition, a mantissa is set in such a way that the 23 bits are placed close to an upper bit side, and all the remaining bits are made "0." On the other hand, in a case where data is transferred from the FCU 201 to the BCU 200, the FCU 201 performs a conversion reverse to that of FIG. 3; i.e., from the internal format (double-extended-precision format) into a designated external format.

Numeral 202 indicates an execution unit (EU) which executes the floating-point arithmetic. The EU 202 receives the converted data in the internal format (double-extended-precision format) from the FCU 201 through an operation data bus 207, and it executes a desired operation. It is constructed of an ALU, a register file, a barrel shifter, etc.

Numeral 203 indicates a microprogram unit (MAC) for executing a floating-point instruction, and an instruction execution code 209 decoded by and output from the MAC 203 is passed through an instruction decoder 204 into FCU control signals 211 and EU control signals 210, by which the FCU 201 and the EU 202 are respectively controlled.

Numeral 205 denotes an instruction sequencer (ISC) for controlling the MAC 203. In addition, a command to the ISC 205 is output from the BCU 200 through an instruction bus 208.

The above description concerns the flow of data. In addition, the BCU 200 receives a command having been output from the CPU 100 and delivers it to the ISC 205. The delivered command is decoded in the ISC 205.

Figure 4:
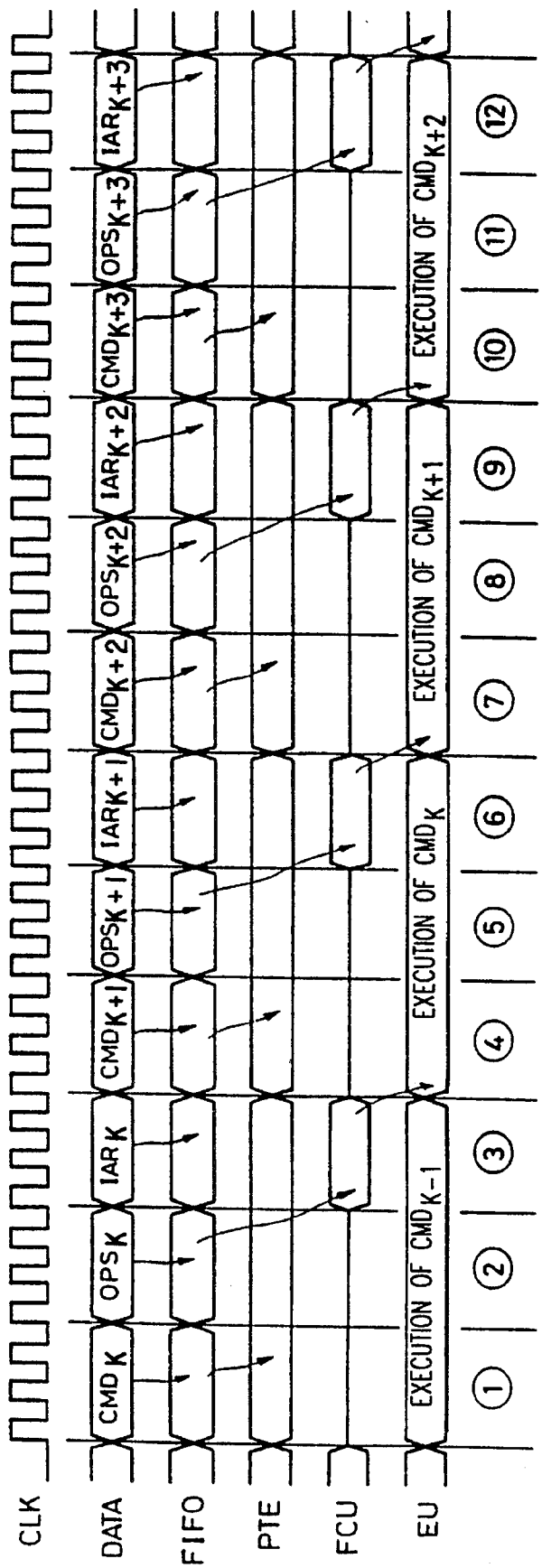
FIG. 4 is a timing chart of a command pipeline control according to the present invention.
Figure 5:
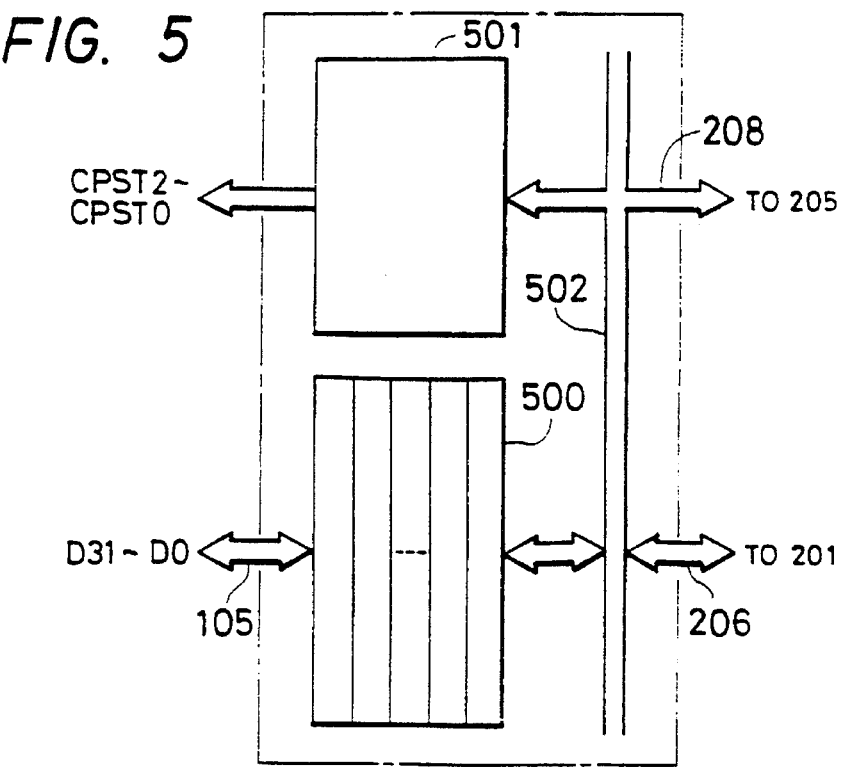
FIG. 5 is a diagram of an embodiment of the internal blocks of a bus control unit.

FIG. 4 is a timing chart for explaining the pipeline control system of the FPU 101. In this figure, the flow of the executions of the k-th command $CMD_k$—the (k+3)-th command $CMD_{k+3}$ are shown. Besides, FIG. 5 shows the internal arrangement of the bus control unit BCU 200.

Numeral 500 denotes a FIFO (First-In First-Out) for fetching data on the commands and operands of the data bus 105. In operation, as illustrated in FIG. 4, the k-th command $CMD_k$ is fetched in the FIFO 500 under a state ① in the figure, the k-th source operand $OPS_k$ is fetched in the FIFO 500 under a state ②, and the k-th instruction address $IAR_k$ is fetched in the FIFO 500 under a state ③. The (k+1)-th command $CMD_{k+1}$, source operand $OPS_{k+1}$ and instruction address $IAR_{k+1}$ are successively fetched in the FIFO 500 under states ④, ⑤ and ⑥; the (k+2)-th command $CMD_{k+2}$, source operand $OPS_{k+2}$ and instruction address $IAR_{k+2}$ are similarly fetched under states ⑦, ⑧ and ⑨; and the (k+3)-th command $CMD_{k+3}$, source operand $OPS_{k+3}$ and instruction address $IAR_{k+3}$ are similarly fetched under states ⑩, ⑪ and ⑫. The commands, operands and instruction addresses fetched in the FIFO 500 are output to a BCU internal bus 502.

Among the data having been output to the BCU internal bus 502, the commands are input to a protocol execution portion (PTE) 501, which controls and manages protocols and supplies the CPU 100 with the signals CPST2–CPST0 indicative of the internal operation status.

In addition, the commands are input to the instruction sequencer 205 through the instruction bus 208.

On the other hand, the operands are input to the format conversion unit (FCU) 201 through the BCU internal bus 502 as well as the conversion data bus 206. (For example, under the state ③, the k-th operand $OPS_k$ is input to the FCU 201, in which the format conversion is executed.)

Subsequently, the data subjected to the format conversion by the FCU 201 is sent to the floating-point execution unit EU 202, which then starts the execution of the k-th command $CMD_k$. Simultaneous with the start of the execution, the fetch of the succeeding (k+1)-th command $CMD_{k+1}$ is started (state ④)

By pipeline-controlling the executions of the BCU 200, FCU 201 and EU 202 in this manner, the processed result of the (k−1)-th command $CMD_{k-1}$ can be obtained at the end of the state ③, that of the k-th command $CMD_k$ at the end of the state ⑥, that of the (k+1)-th command $CMD_{k+1}$ at the end of the state ⑨, and that of the (k+2)-th command $CMD_{k+2}$ at the end of the state ⑫. Shown in FIG. 4 is a case where the source operands are fetched from a memory and where destination operands are fetched from a register.

Next, FIGS. 6–11 are diagrams elucidating the execution of protocols.

Basic protocols can be broadly classified as follows:

(1) Case where an operand out transfer exists, that is, where a succeeding command is accepted in synchronism with an output.

(2) Case of an n-term instruction or the like where a burst transfer is impossible.

(3) Case of a conditional branch or the like where no command is accepted until the execution of a preceding command ends.

(4) Case of a privileged instruction or the like where the command thereof is accepted at any time.

(5) Case other than the above cases (1)–(4), where the operand out transfer does not exist.

Depending upon these cases (1)–(5), the FPU 101 provides the signals CPST2–CPST0 and executes the protocol in a bus cycle concerning the FPU 101, subsequent to a command transfer (command transfer protocol), or when informing the CPU 100 of the grant or reservation of the start of the in/out transfer of an operand or the occurrence of any of various exceptions (operand transfer protocol).

The command transfer protocols are divided into the following cases:

(1) Case where the operand out transfer does not exist.

(2) Case where the operand out transfer exists.

(3) Case of the conditional branch.

(4) Case of FREST.

(5) Case of the privileged instruction.

Table 3 lists the output statuses of the signals CPST2–CPST0 (Table 1) in the respective cases. In the command transfer protocols, the following output statuses of the signals CPST2–CPST0 are used:

(1) ACC (Accepted)/TRUE (2) CERR (Command Error)

(3) BUSY (4) EXCP (Exception)

(5) DTR (Data Transfer Ready)/FALSE

In each of the aforementioned cases, the output conditions of the statuses ACC, CERR, BUSY, EXCP and DTR are listed. These conditions correspond to the case of performing the pipeline control, and depend upon the status of preceding and current commands. Here, the "preceding command" signifies a command which has been output from the FIFO 500 of the BCU 200. In addition, the "current command" signifies a command which has been currently input to the FIFO 500.

The operand transfer protocol is executed in such a way that the FPU 101 handshakes with the CPU 100 in accordance with the DTR status of the signals CPST2–CPST0 thereof. In the absence of an error in both the preceding command and the current command, when an operand needs to be input, the CPU 100 acknowledges and decides the DTR status of the signals CPST2–CPST0, and thereafter, the transfer of the operand is started. Besides, the signals CPST2–CPST0 indicate the BUSY status until the internal status of the FPU 101 gets ready to transfer the next operand.

In outputting an operand, the protocol is executed as in the operand input by the handshake of the FPU 101 with the CPU 100 in accordance with the DTR status of the signals CPST2–CPST0. That is, the start of an operand transfer cycle is granted according to the DTR status. Thereafter, the FPU 101 delivers the BUSY status until it becomes an internal status capable of outputting the signals of the DTR status for granting the transfer of the next operand.

Now, the timing charts of protocols are shown in FIGS. 6–11. Timings differ between an operation mode and an addressing mode.

Figure 6:
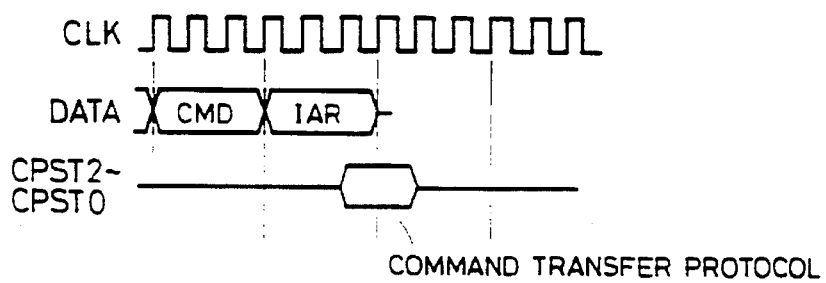
FIGS. 6–11 are detailed timing charts of protocols in an embodiment of the present invention.

FIG. 6 is the detailed timing chart of the monadic and dyadic operations between a register (source) and a register (destination).

First, a command CMD on the data bus 105 is fetched in the FIFO 500 of the BCU 200. While an instruction address IAR is further fetched, the BCU 200 decodes the protocol of the command and generates a command transfer protocol in the protocol signals CPST2–CPST0 in accordance with conditions listed in Table 3.

TABLE 3

| | Command Transfer Protocols | | | | |
|---|---|---|---|---|---|
| CPST2–CPST0 | Absence of Operand out transfer | Presence of Operand out transfer | Conditional branch | FREST | Privileged instruction |
| ACC (Accepted) | There is neither the execution error of a preceding command nor the command error of a current command, and the FIFO has room for data | There is neither the execution error of a preceding command nor the command error of a current command, and each unit has no data. | ACC is TRUE (condition held) when there is neither the execution error of a preceding command nor the command error of a current command, and each | There is neither the execution error of a preceding command nor the command error of a current command, and each unit has no data. | A current command has no command error. |

TABLE 3-continued

Command Transfer Protocols

| CPST2–CPST0 | Absence of Operand out transfer | Presence of Operand out transfer | Conditional branch | FREST | Privileged instruction |
| --- | --- | --- | --- | --- | --- |
| CERR (Command Error) | input. A preceding command has no execution error, a command error develops in a current command, and each unit comes to have no data. | Same as the left. | unit has no data. Same as the left. | Same as the left. | A command error develops in a current command. |
| BUSY (Busy) | In a case where a preceding command has no execution error and where a command error develops in a current command, the preceding command has not ended yet, or the FIFO is filled up with data. | The FIFO is filled up when a preceding command has not ended yet (in a case where the preceding command has no execution error and where a command error develops in a current command, or in a case where there is neither the execution error of the preceding command nor the command error of the current command. | Same as the left. | Same as the left. | — |
| EXCP (Exception) | An execution error develops in a preceding command, and the EU has ended its execution. | Occasion on which an execution error develops in a preceding command, and the execution of the EU has ended, or occasion on which the execution error develops in the preceding command, and the execution of the EU has not ended. | Occasion on which the execution error of a conditional branch develops, or occasion on which an execution error develops in a preceding command. | Same as the left. | — |
| DTR (Data Transfer Ready) | — | — | DTR is FALSE (condition not held) when there is neither the execution error of a preceding command nor the command error of a current command and each unit has no data. | — | — |

Also, FIG. 6 is the detailed timing chart of a branch instruction. In the operation, a branch command CMD on the data bus 105 is fetched in the FIFO 500 of the BCU 200. While an instruction address IAR is further fetched, the BCU 200 decodes a branch condition, to generate TRUE (ACC) if the condition is true and FALSE (DTR) if it is false, in the protocol signals CPST2–CPST0 as indicated in Table 3.

Figure 7:
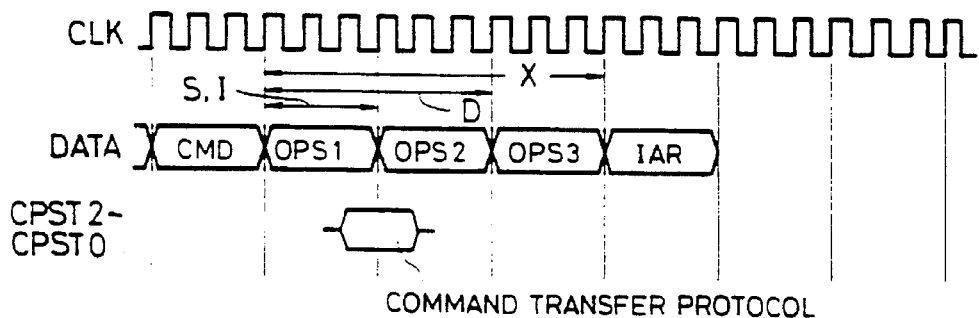

FIG. 7 is the detailed timing chart of the monadic and dyadic operations between a memory (source) and a register (destination). Since, in this case, the operand(s) of the source is the data of the memory, the source operand(s) on the data bus 105 needs to be fetched. In the operation, a command CMD on the data bus 105 is fetched in the FIFO 500 of the BCU 200. Thereafter, data items in numbers required depending upon the size of the operand(s), the single precision S, the integer I, the double precision D and the double extended precision X are fetched in the FIFO 500 within the BCU 200. Besides, a command transfer protocol is generated as the protocol signals CPST2– CPST0 in accordance With Table 3. After all the operands of the source have been transferred, an instruction address IAR is fetched in the BCU 200.

Figure 8:
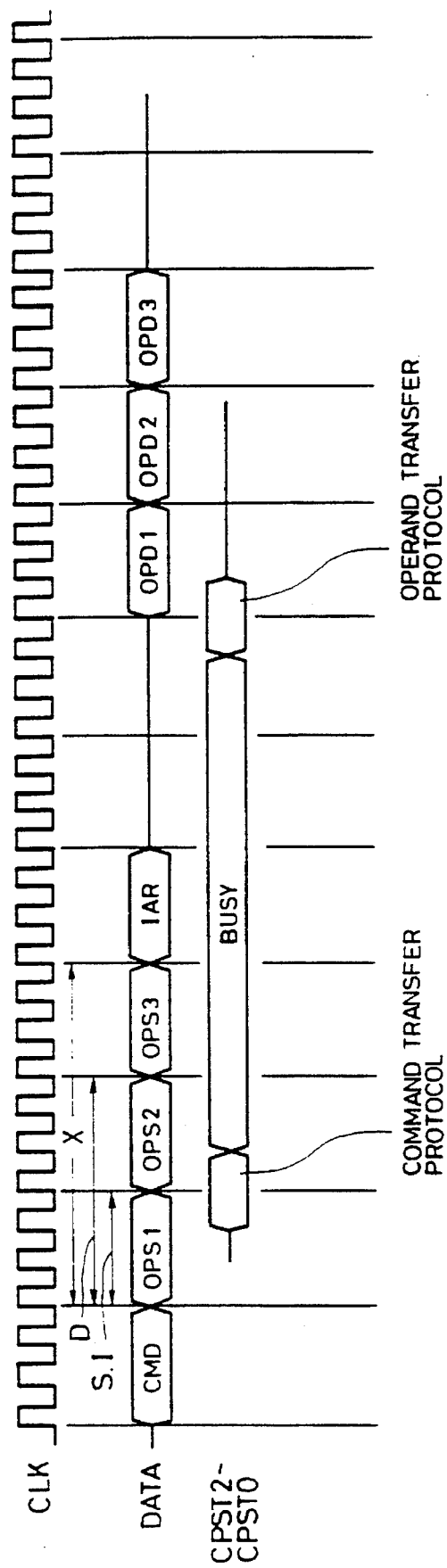

FIG. 8 is the detailed timing chart of the monadic operation between a memory (source) and a memory (destination) and the dyadic operation between a register (first source) as well as a memory (second source) and a memory (destination). In this case, the operands of the sources are the data of the memory, and the operands of the destination become storing data into the memory, so that the bus cycles of the operands arise twice. In the operation, a command CMD on the data bus 105 is fetched in the FIFO 500 within the BCU 200. Thereafter, in the same manner as in FIG. 7, data items in numbers required depending upon the size of the operands, the single precision S, the integer I, the double precision D and the double extended precision X are fetched in the FIFO 500 within the BCU 200. In addition, a command transfer protocol is generated as the protocol signals CPST2–CPST0. Since the destination is the memory, the BUSY status is output as the signals CPST2–CPST0 till the end of the operations. When, upon the end of the operations, the FPU 101 has got ready to transfer data (in accordance with an operand transfer protocol), the status DTR (Data Transfer Ready) is output, and the operand data of the destination is transferred to the memory. Also in this case, the data items in numbers required depending upon the size of the operands, the single precision S, the integer I, the double precision D and the double extended precision X are transferred from the FIFO 500 within the BCU 200.

Figure 9:
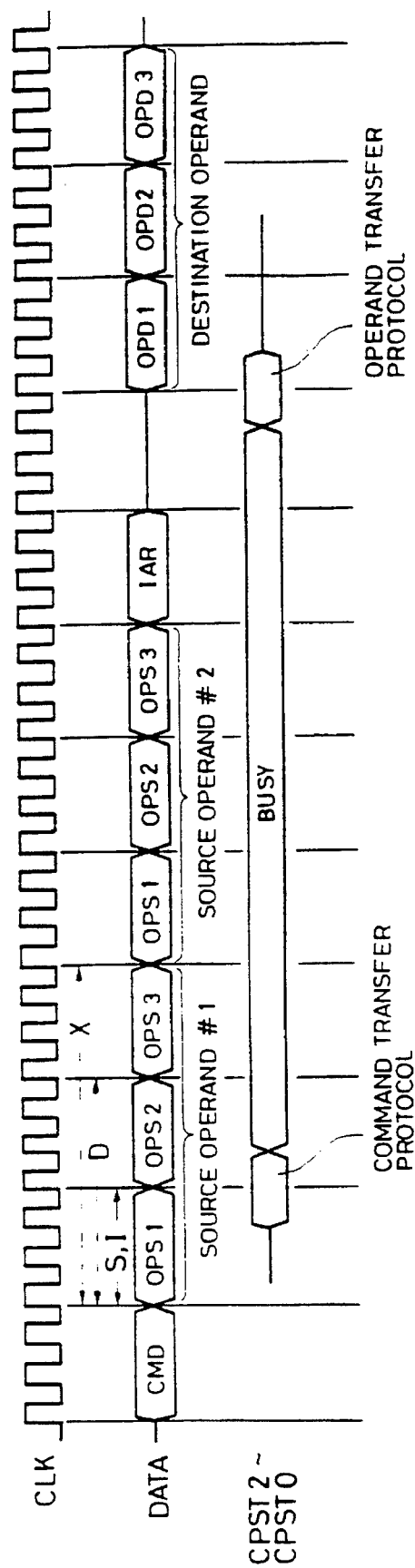

FIG. 9 is the detailed timing chart of the dyadic operation between a memory (source) and a memory (destination). In this case, the two operands of the source are the data of the memory, and the operand of the destination also becomes storing data into the memory, so that the bus cycles of the operands arise three times. In the operation, a command CMD on the data bus 105 is fetched in the FIFO 500 of the BCU 200. Thereafter, in the same manner as in FIG. 7, source operand #1 and source operand #2 as data items in numbers required depending upon the size of the operands, the single precision S, the integer I, the double precision D and the double extended precision X are fetched in the FIFO 500 within the BCU 200. Further, an instruction address IAR is fetched. Also in this case, as in FIG. 8, the BUSY status continues to be output as the protocol signals CPST2–CPST0 till the end of the operation. When, upon the end of the operation, the FPU 101 has got ready to transfer data, the status DTR (Data Transfer Ready) is output according to an operand transfer protocol so as to transfer the operand data of the destination to the memory. Also in this case, the data items in numbers required depending upon the size of the operands, the single precision S, the integer I, the double precision D and the double extended precision X are transferred from the FIFO 500 within the BCU 200.

The FPU 101 has data transfer instructions besides operation instructions in the monadic and dyadic forms, etc. The data transfer instructions include an instruction of data transfer (operand in transfer) from the memory to the register of the FPU and an instruction of data transfer (operand out transfer) from the register of the FPU to the memory.

Figure 10:
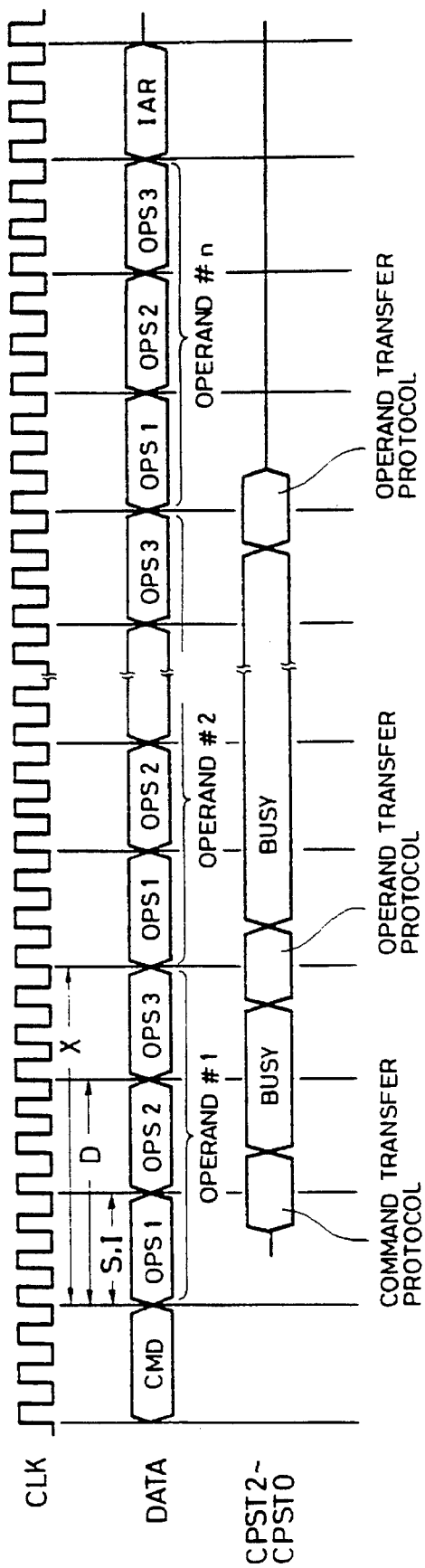
Figure 11:
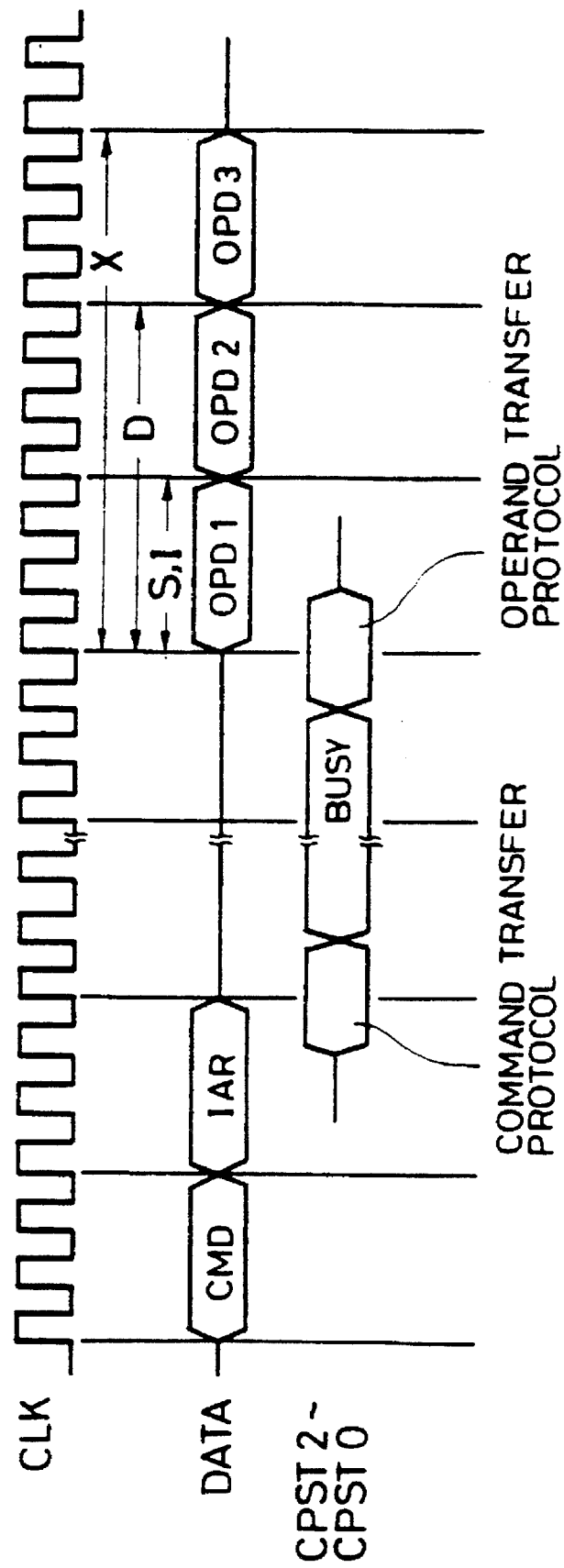

FIG. 10 shows the detailed timing chart of a large number of operand in-transfer instructions, while FIG. 11 shows the detailed timing chart of an operand out-transfer instruction.

Regarding the n operand in-transfer instructions in FIG. 10, in the same manner as in FIG. 7, data items in numbers required depending upon the size of the operands of sources, the single precision S, the integer I, the double precision D and the double extended precision X are fetched in the FIFO 500 within the BCU 200, while data items are sent to the FCU 201. In the operation, after a command CMD on the data bus 105 is fetched in the FIFO 500 within the BCU 200, the first source operand #1 is fetched, and thereafter, the protocol signals CPST2–CPST0 output the status DTR (Data Transfer Ready) in accordance with an operand transfer protocol. In the illustrated case, there are n source operands, so that the signals CPST2–CPST0 output the statuses BUSY and DTR alternately until the transfer of source operand #n ends.

FIG. 11 illustrates one operand out-transfer instruction. In the operation, a command CMD on the data bus 105 is fetched in the FIFO 500 within the BCU 200. Thereafter, the BCU 200 fetches an instruction address IAR because a source operand resides in the register of the FPU 101.

At that time, the protocol signals CPST2–CPST0 output a command transfer protocol in accordance with Table 3. Thereafter, the status BUSY is output until the FPU 101 gets ready to transfer an operand. When the FPU has got ready for the transfer, the signals CPST2–CPST0 outputs the status DTR being an operand transfer protocol, and operand data items OPD1–OPD3 are delivered onto the data bus 105.

Incidentally, although one bus cycle is performed by three clock pulses in the drawings, this is not restrictive.

According to the present invention, floating-point arithmetic is functionally divided and is pipeline-controlled, whereby a command pipeline can be realized, so that the overhead of an interface in the floating-point arithmetic can be lessened, which is effective to enhance an operating speed. Moreover, protocols are defined between a microprocessor and a floating-point processor, so that disposal at the occurrence of an error is facilitated. The protocols are applicable to coprocessors other than the floating-point processor.

What is claimed is:

1. A coprocessor, connected, via a bus, and a control bus to a CPU that decodes instructions processes data, and sends said instructions to the coprocessor; and connected, via said bus, to a ROM that stores the instructions, and a RAM that holds data and operands, wherein the coprocessor receives instructions via the bus, and processes data in response to the received instructions, comprising:

an internal coprocessor bus;

first means, connected to said internal coprocessor bus, for executing protocols and returning an internal operation status via said control bus in response to receiving an instruction and an operand, sent from the CPU to said coprocessor, based on an internal operation status of said coprocessor, and said means for executing protocols comprising means for returning an internal operation status of the coprocessor to the CPU;

second means, connected to said internal coprocessor bus, for executing the received instructions and operands independent of said first means for executing protocols, wherein while said second means executes an instruction said first means executes protocols and returns an internal operation status in response to a subsequent instruction; and third means, connected to the bus and said internal coprocessor bus, for performing pipeline control of said first means and said second means, which pipeline is a receipt of the instructions and operands during the execution of a preceding instruction.

2. The coprocessor of claim 1, wherein said third means comprises a FIFO memory, said FIFO memory receiving said instructions and operands for the coprocessor.

3. In the coprocessor of claim 1, said first means comprises means for receiving first signals which indicate a type of an access desired by said CPU, and means for judging the receipt of instructions and operantes in accordance with said first signals.

* * * * *

UNITED STATES PATENT AND TRADEMARK OFFICE
CERTIFICATE OF CORRECTION

PATENT NO. : 5,504,912                                   Page 1 of 11
DATED     : 2 April 1996
INVENTOR(S) : Shigeki MORINAGA et al.

It is certified that error appears in the above-identified patent and that said Letters Patent is hereby corrected as shown below:

| Column | Line | |
|--------|------|---|
| 1 | 11 | After "INVENTION" delete ":". |
| 1 | 12 | Change "anti" to --and--. |
| 1 | 14 | Before "interface" change "the" to --an--. |
| 1 | 15 | Delete "which is". |
| 1 | 17 | After "1983" change "." to --,--. |
| 1 | 20 | Before "exexcution" insert --preceding instruction's--. |
| 1 | 21 | Delete "of the preceding instruction". |
| 1 | 23 | Delete "overhead of the interface" and insert --interface's overhead--. |
| 1 | 25 | Delete "has the". |

UNITED STATES PATENT AND TRADEMARK OFFICE
CERTIFICATE OF CORRECTION

PATENT NO. : 5,504,912
DATED : 2 April 1996
INVENTOR(S) : Shigeki MORINAGA et al.

It is certified that error appears in the above-identified patent and that said Letters Patent is hereby corrected as shown below:

| Column | Line | |
|---|---|---|
| 1 | 26 | Change "problem of" to --suffers from--. |
| 1 | 32 | Delete "in such a way that" and insert --by having--. |
| 1 | 33 | Before "instructions" insert --the coprocessor's--; delete "in the coprocessor is". |
| 1 | 44 | After "items" insert --to the coprocessor-- |
| 1 | 45 | Change "up, and further, the" to --up. The--; after "coprocessor" insert --also--. |
| 1 | 46 | Delete "so as to be capable of" and insert --enable--; after "control" change "," to --.--. |
| 1 | 47 | Change "so that" to --As a result,--. |

UNITED STATES PATENT AND TRADEMARK OFFICE
CERTIFICATE OF CORRECTION

PATENT NO. : 5,504,912
DATED : 2 April 1996
INVENTOR(S) : Shigeki MORINAGA et al.

It is certified that error appears in the above-identified patent and that said Letters Patent is hereby corrected as shown below:

| Column | Line | |
|---|---|---|
| 2 | 4 | After "FIG. 1 is a" insert --floating-point arithmetic--. |
| 2 | 5 | After "system" delete "which realizes floating-point arithmetic. In". |
| 2 | 6 | Delete "order to" and insert --To--. |
| 2 | 8 | After "101" change "," to --.--; delete "which" and insert --The CPU 100 and FPU 101--. |
| 2 | 10 | Delete "which"; delete "well". |
| 2 | 11 | After "substrate" insert --as well--. |
| 2 | 20 | Delete "such" and insert --the--; after "properties" insert --described above--. |

UNITED STATES PATENT AND TRADEMARK OFFICE
CERTIFICATE OF CORRECTION

PATENT NO. : 5,504,912                              Page 4 of 11

DATED : 2 April 1996

INVENTOR(S) : Shigeki MORINAGA et al.

It is certified that error appears in the above-identified patent and that said Letters Patent is hereby corrected as shown below:

| Column | Line | |
|---|---|---|
| 2 | 21 | Delete "data of the". |
| 2 | 22 | After "integer-type" insert --data--; after "and" delete "the". |
| 2 | 36 | Change "AT3" to --AT2--; after "is" delete "a" and insert --an externally supplied clock signal--. |
| 2 | 37 | Deleete "which is externally supplied, and which serves" and insert --serving--. |
| 2 | 38 | Before "internal" delete "the". |
| 2 | 41 | Delete "which". |
| 2 | 42 | Change "indicates" to --indicating--. |

UNITED STATES PATENT AND TRADEMARK OFFICE
CERTIFICATE OF CORRECTION

PATENT NO.  : 5,504,912
DATED       : 2 April 1996
INVENTOR(S) : Shigeki MORINAGA et al.

It is certified that error appears in the above-identified patent and that said Letters Patent is hereby corrected as shown below:

| Column | Line | |
|---|---|---|
| 2 | 48 | Change "thereinto" to --to the external memory--. |
| 2 | 49 | Change "In a case where" to --When--. |
| 2 | 53 | Change "Besides, in a case where" to --In addition, when--. |
| 2 | 60 | Deleete "which indi-". |
| 2 | 61 | Change "cate" to --indicating--. |
| 2 | 62 | Delete "which are". |
| 2 | 63 | Delete "which", delete "an". |
| 2 | 64 | Delete "in", delete "a way". |

UNITED STATES PATENT AND TRADEMARK OFFICE
CERTIFICATE OF CORRECTION

PATENT NO. : 5,504,912
DATED : 2 April 1996
INVENTOR(S) : Shigeki MORINAGA et al.

It is certified that error appears in the above-identified patent and that said Letters Patent is hereby corrected as shown below:

| Column | Line | |
|---|---|---|
| 3 | 1 | Delete "indicative of" and insert --indicating--. |
| 3 | 6 | Delete "which are". |
| 3 | 25 | Delete "which is". |
| 3 | 27 | Before "output" insert --been readied for-- |
| 3 | 58 | Delete "by". |
| 3 | 59 | After "which" insert --converts--. |
| 3 | 61 | Delete "are converted"; delete "data in an internal format" and insert --an internally formatted data--. |
| 3 | 65 | Before "operation" insert --format conversion--. |

UNITED STATES PATENT AND TRADEMARK OFFICE
CERTIFICATE OF CORRECTION

PATENT NO. : 5,504,912
DATED : 2 April 1996
INVENTOR(S) : Shigeki MORINAGA et al.

It is certified that error appears in the above-identified patent and that said Letters Patent is hereby corrected as shown below:

| Column | Line | |
|---|---|---|
| 3 | 66 | Change "in a case where" to --when--. |
| 4 | 6 | Change "in such a way" to --such--. |
| 4 | 8 | Delete "in a case". |
| 4 | 9 | Change "where" to --when--. |
| 4 | 15 | Delete "through" and insert --via--. |
| 4 | 16 | After "207" insert --. The EU 202 then--; before "executes" delete "and it". |
| 4 | 19 | After "instruction" (first occurrence) delete ", and an" and insert --. An--. |
| 4 | 22 | Delete "by"; after "which" insert --control--. |

UNITED STATES PATENT AND TRADEMARK OFFICE
CERTIFICATE OF CORRECTION

PATENT NO. : 5,504,912
DATED : 2 April 1996
INVENTOR(S) : Shigeki MORINAGA et al.

It is certified that error appears in the above-identified patent and that said Letters Patent is hereby corrected as shown below:

| Column | Line | |
|---|---|---|
| 4 | 23 | Delete "are"; after "respectively" delete "controlled". |
| 4 | 27 | Change "through" to --via--. |
| 4 | 30 | Delete "having been". |
| 4 | 35 | After "$CMD_k$" delete "--" and insert --through--. |
| 4 | 36 | Change "Besides," to --In addition,--. |
| 4 | 38 | After "FIFO" insert --buffer--. |
| 4 | 40 | Change "In" to --During--. |
| 4 | 56 | Delete "having been". |
| 4 | 58 | Delete ", which" and insert --. The PTE 501--. |

UNITED STATES PATENT AND TRADEMARK OFFICE
CERTIFICATE OF CORRECTION

PATENT NO. : 5,504,912
DATED : 2 April 1996
INVENTOR(S) : Shigeki MORINAGA et al.

It is certified that error appears in the above-identified patent and that said Letters Patent is hereby corrected as shown below:

| Column | Line | |
|---|---|---|
| 4 | 60 | Delete "indicative of" and insert --indicating--. |
| 6 | 13 | Delete "which has been". |
| 6 | 15 | Delete "which has been". |
| 6 | 18 | Delete "in"; after "such" delete "a way". |
| 6 | 26 | Delete "Besides," and insert --In addition,--. |
| 6 | 35 | Change "it becomes an" to --it's--. |
| 6 | 36 | After "status" insert --becomes--. |
| 8 | 52 | Change "Besides" to --In addition--. |
| 9 | 6 | Change "till" to --until--. |

UNITED STATES PATENT AND TRADEMARK OFFICE
CERTIFICATE OF CORRECTION

PATENT NO. : 5,504,912

DATED : 2 April 1996

INVENTOR(S) : Shigeki MORINAGA et al.

It is certified that error appears in the above-identified patent and that said Letters Patent is hereby corrected as shown below:

| Column | Line | |
|---|---|---|
| 9 | 7 | Change "When, upon" to --Upon--. |
| 9 | 8 | Change "got" to --become--. |
| 9 | 17 | Delete "In". |
| 9 | 18 | Change "this case" to --Here--. |
| 9 | 29 | After "Also" insert --,--. |
| 9 | 31 | Change "till" to --until--; change "When, upon" to --Upon--. |
| 9 | 32 | Change "got" to --become--. |
| 9 | 35 | After "Also" insert --,--. |
| 9 | 56 | Change "In" to --During--. |
| 10 | 19 | Change "which is effective to enhance" to --thereby enhancing--. |

UNITED STATES PATENT AND TRADEMARK OFFICE
CERTIFICATE OF CORRECTION

PATENT NO. : 5,504,912
DATED : 2 April 1996
INVENTOR(S) : Shigeki MORINAGA et al.

It is certified that error appears in the above-identified patent and that said Letters Patent is hereby corrected as shown below:

| Column | Line | |
|--------|------|---|
| 10 | 27 | After "instructions" insert --,--. |
| 10 | 58 | Change "In the" to --The--; after "1," insert --wherein--. |
| 10 | 59 | After "prises" insert --:-- and paragraph; change "which indicate" to --indicating--. |
| 10 | 60 | After "CPU" change "," to --;--; after "and" start new indented paragraph. |
| 10 | 61 | Change "operantes in accordance with" to --operands based on--. |

Signed and Sealed this

Fourth Day of March, 1997

Attest:

BRUCE LEHMAN

*Attesting Officer*  Commissioner of Patents and Trademarks